United States Patent [19]

Reilly

[11] Patent Number: 4,953,889
[45] Date of Patent: Sep. 4, 1990

[54] ADJUSTMENT OF CAMBER IN FOUR WHEEL DRIVE

[75] Inventor: Bruce J. Reilly, Lot B & C, Campbell Street, Narellan, New South Wales, Australia

[73] Assignees: Bruce John Reilly; Joyce Lynette Reilly, both of New South Wales, Australia

[21] Appl. No.: 312,393

[22] Filed: Feb. 21, 1989

Related U.S. Application Data

[63] Continuation of Ser. No. 97,774, Sep. 18, 1987, abandoned.

[30] Foreign Application Priority Data

Sep. 18, 1986 [AU] Australia .................... PH8099

[51] Int. Cl.[5] ............................................. B62D 17/00
[52] U.S. Cl. ....................................... 280/661; 180/254; 403/4
[58] Field of Search ................. 280/661, 95 R, 96.1, 280/95.1; 180/253, 254; 403/4, DIG. 8, 161, 162; 384/255

[56] References Cited

U.S. PATENT DOCUMENTS

| | | | |
|---|---|---|---|
| 1,972,840 | 9/1934 | Graf | 384/255 |
| 2,890,893 | 6/1959 | Laukhuff | 280/661 |
| 2,923,555 | 2/1960 | Kost et al. | 280/661 |
| 3,866,946 | 2/1975 | Robison | 384/255 |
| 4,195,862 | 4/1980 | Specktor et al. | 280/661 |
| 4,252,338 | 2/1981 | Ingalls et al. | 280/661 |
| 4,385,677 | 5/1983 | Sowers | 180/254 |
| 4,795,187 | 1/1989 | Ingalls | 280/661 |

FOREIGN PATENT DOCUMENTS

| 92264 | 5/1984 | Japan | 280/661 |
|---|---|---|---|
| 994028 | 6/1965 | United Kingdom . | |

Primary Examiner—Charles A. Marmor
Assistant Examiner—Karin Tyson
Attorney, Agent, or Firm—Nixon & Vanderhye

[57] ABSTRACT

A camber adjusting system for use on the steerable wheels in a closed knuckle steering system comprises eccentrically mounting the steering knuckle relative to the axle tube such that the camber angle of the steering knuckle is adjustable by rotation of the eccentric mounting between the knuckle and the axle tube until the desired camber angle is achieved.

8 Claims, 5 Drawing Sheets

ADJUSTMENT OF CAMBER IN FOUR WHEEL DRIVE

This is a continuation of application Ser. No. 07/097,774, filed Sept. 18, 1987, now abandoned.

The present invention relates to the adjustment of camber in four wheel drive vehicles or other vehicles which employ a solid steerable front axle arrangement in conjunction with a closed steering knuckle.

Camber, being described as the inward or outward tilt of the wheel at the tip, is an important feature of steering geometry which has substantial effects on tire wear. Incorrect camber will cause a tire to wear unevenly across the road contact or tread surface. It is generally accepted that correct camber is of greater importance to the steering wheels of a vehicle than to non-steering wheels, due to the greater loads to which steering wheels are subjected. This situation is compounded in four wheel drive vehicles because driving power is also transmitted through the steering wheels and, also, the tires on four wheel drive vehicles have a tendency to be wider than those of conventional vehicles for flotation effect, thus increasing any difference in wear rate between inner and outer tire extremities. With the rapid increase in popularity and acceptance of the radial tire, a more critical camber specification is essential for optimum tread life. Incorrect camber adjustment can also result in poor steering characteristics. Camber adjustment is often necessary to encompass local industry problems met with in the importation of axles from abroad where camber and other geometry settings preferred, differ from the inappropriate factory specifications. Too wide a factory tolerance, variance in road crown pitches and right or left hand status all create justification for camber change provisions.

Numerous approaches have been adopted in the prior art to address the problem of poor or unsuitable camber and the consequential effects on tire life. One of the more primitive responses has been to rotate tires in an attempt to achieve even wear of tires. Another response has been to bend the axle to a desired position thus changing the camber. Neither of these approaches is adequate. The former approach does nothing to solve the underlying problem and the latter approach may promote stress failure in the tubular axle housing common to most four wheel drive vehicles.

U.S. Pat. Nos. 4,037,680 and 4,195,862 both disclose a method of adjusting the camber of the front wheels of a four wheel drive vehicle which, although directed to an open steering knuckle arrangement, can be equally well applied to a closed steering knuckle arrangement. A shim of non uniform thickness is inserted between the steering knuckle and the knuckle spindle; thus the orientation of the knuckle spindle can be change, effecting the camber of the steering wheel.

This method is deficient for a number of reasons. To insert the prior art shim requires the removal of the knuckle spindle. This can be a relatively complicated and time consuming task, as most modern four wheel drive vehicles have a free wheeling hub arrangement, which has to be disengaged from the drive stub when the knuckle spindle is removed and re-engaged when the drive spindle is reinstalled. It is desirable to interfere with such components as little as practicable. Also, when the shim is inserted, rotation of the knuckle spindle and drive stub will occur about different points because there is a lateral separation between the universal joint at the end of the drive stub and the join between the steering knuckle and knuckle spindle where the shim is inserted. Consequently shim adjustment of camber results in a slight misalignment of the knuckle spindle and drive stub. As discussed above, the insertion of a shim affects the orientation of the knuckle spindle with respect to the steering knuckle. Due to the thickness of the shim, the knuckle spindle is dislocated laterally with respect to the steering knuckle. Lateral dislocation often requires the fitment of a non standard thinner circlip or machining of the hub gearing thrust face during reassembly of the free wheel hub mechanism. This dislocation and reorientation of components causes slight relative shifts in positions between the drive stub, axle shaft, steering knuckle, knuckle spindle and axle shaft housing. As a consequence, damage and ongoing maintenance problems related to oil seals are not uncommon, due to components being misaligned or dislocated. Often premature damage of intricate parts occurs during fitment of the prior art shim particularly to tab locking washers, wheel bearing nuts, gaskets, screws and small componentry.

Problems related to dislocation and disorientation of components are particularly important in the case of vehicles which have front disc brakes. This is because the brake caliper is normally connected to the steering knuckle but the disc is attached to the spindle. Hence the brake caliper and disc become both disoriented and dislocated when camber is adjusted by shim insertion. This situation can be corrected by either grinding and filing components or inserting other shims to compensate for this effect, but the requisite compensating adjustments need to be performed to a high degree of precision and are often performed incompetently, resulting in consequential braking problems in the vehicle.

U.S. Pat. Nos. 4,400,007 and 4,252,338 both disclose a simple and easily installed method of adjusting camber and caster for an open steering knuckle arrangement. In this prior art an open steering knuckle is connected by upper and lower ball joints to a yoke, situated at the end of an axle housing. A conventional concentric housing, that receives the ball joint in the yoke, is replaced by a bushing that receives the ball joint eccentrically. This presents no problem as ball joints are pivotable and can easily be reoriented. Thus the orientation of the steering knuckle can be varied in relation to the yoke and, consequently, camber or caster can be varied. This method is, however, not applicable to closed knuckle arrangements which do not use ball joints but instead use rigid knuckle arms and/or bearing caps. Furthermore, whilst more detailed an involvement than the more commonly required camber adjustment described, a means of varying the castor in the closed knuckle steering system has been invented by the present applicant. No prior art in this respect is known. When a castor problem is experienced, the general situation in the prior art has been acceptance of the problem with reservation or replacement of the axle housing with one or more preferred and hopefully correct castor settings. Axle housing replacement involves high cost, involved and time consuming mechanical disassembly and reassembly of a myriad of intricate componentry.

For the purpose of this specification of term "bearing cap" is used to include within its scope steering or knuckle arms that include an integrated bearing cap. Toyota four wheel drive vehicles, for example, use such a knuckle arm.

According to a first aspect of the present invention there is disclosed a complementary pair of upper and lower bearing caps (as hereinbefore described) to provide camber adjustment in a closed knuckle steering system wherein each bearing cap comprises:

a backing plate adapted for rigid connection to said closed steering knuckle, a first part extending from said backing plate adapted for engagement in said closed steering knuckle and, a second part extending eccentrically from said first part, said second part being adapted to engage rotatably in said axle tube end, eccentricity between said first and second parts providing camber adjustment when said complementary upper and lower bearing caps are installed in said closed knuckle steering system.

A second aspect of the present invention provides a means to vary the relationship of castor on one side of a vehicle as compared to the other side, thus providing a difference or spread of castor.

According to a further aspect of the present invention there is a system to reorient the king pin axis of a closed knuckle steering system comprising a pair of complementary upper and lower inserts adapted for location in an axle tube end of said steering system, each said insert having an outer surface coaxial with an original king pin axis and an inner surface coaxial with a reoriented king pin axis.

The resulting adjustment embodies a means whereby an offset or self aligning force can be utilised to counter a pull effect of high road crown surfaces where the tendency of a vehicle to run or pull to the downwardly or outer side of the road is experienced. This phenomenon is found particularly with vehicles manufactured in countries where settings are more suited to flat road surfaces or to suit driving status on the opposite side of the road, where a castor difference is the opposite to that required in final country of vehicle destination.

Incorrect castor or castor bias insufficient to counter high crowned road surfaces produces constant driver correction to maintain vehicle direction, produces unsafe driving effects, driver fatigue and in addition the opposing force applied by the driver offsets the steering tires to some variance to that of the vehicle thrust angle creating a tire scrub effect. These aforementioned steering geometry related problems are not being addressed with the attention deserved by some manufacturers. The problems are particularly relevant in all respects outlined in the country of origin of the invention, Australia.

The inventor has considerable expertise and practical industry wheel alignment knowledge in these matters having personally performed or supervised with involvement in the analysis and correction of over 30,000 vehicle alignments in a 10 year dedication and commitment to the wheel alignment industry. Referring back to camber principles, the camber angle can be minimally and within limits used to help offset road crown pull by applying a difference in camber between sides of the four wheel drive vehicle described herein by application of the theory that a tilted wheel will roll around the apex of its cone. However camber indifference in some examples met with in the four wheel drive vehicle described herein is insufficient to current road crown pull effect. The principles outlined have been minimally described in U.S. Pat. No. 2,923,555 written to described U.S.A. road conditions with considered low road crown pitches and left hand drive status.

The preferred embodiment of the second aspect of the present invention relate to the provision of a means of castor change within the closed knuckle system of four wheel drive axle front axle which involves substitution of the existing upper and lower bearing cones in the axle tube end with an eccentrically arranged bearing cone or a cone of lesser external dimensions being located in an eccentrically machined bushing. The eccentricity of the arrangement being opposed in respect to upper and lower unit by 180° out of phase, effects the king pin angle directly relating to a change of castor angle.

It would only be customary to undergo a castor change on one side of the axle by fitment of one embodiment of this aspect of the invention, such arrangement being produced and calculated to vary the castor by a predetermined amount.

Because castor adjustment is a more involved process than camber adjustment castor adjustment would only be undertaken on occasions when wheel pull or drift is so great that sufficient correction could not be obtained by camber adjustment.

The present invention will now be described in detail with reference to the attached drawings in which.

Figure 1:
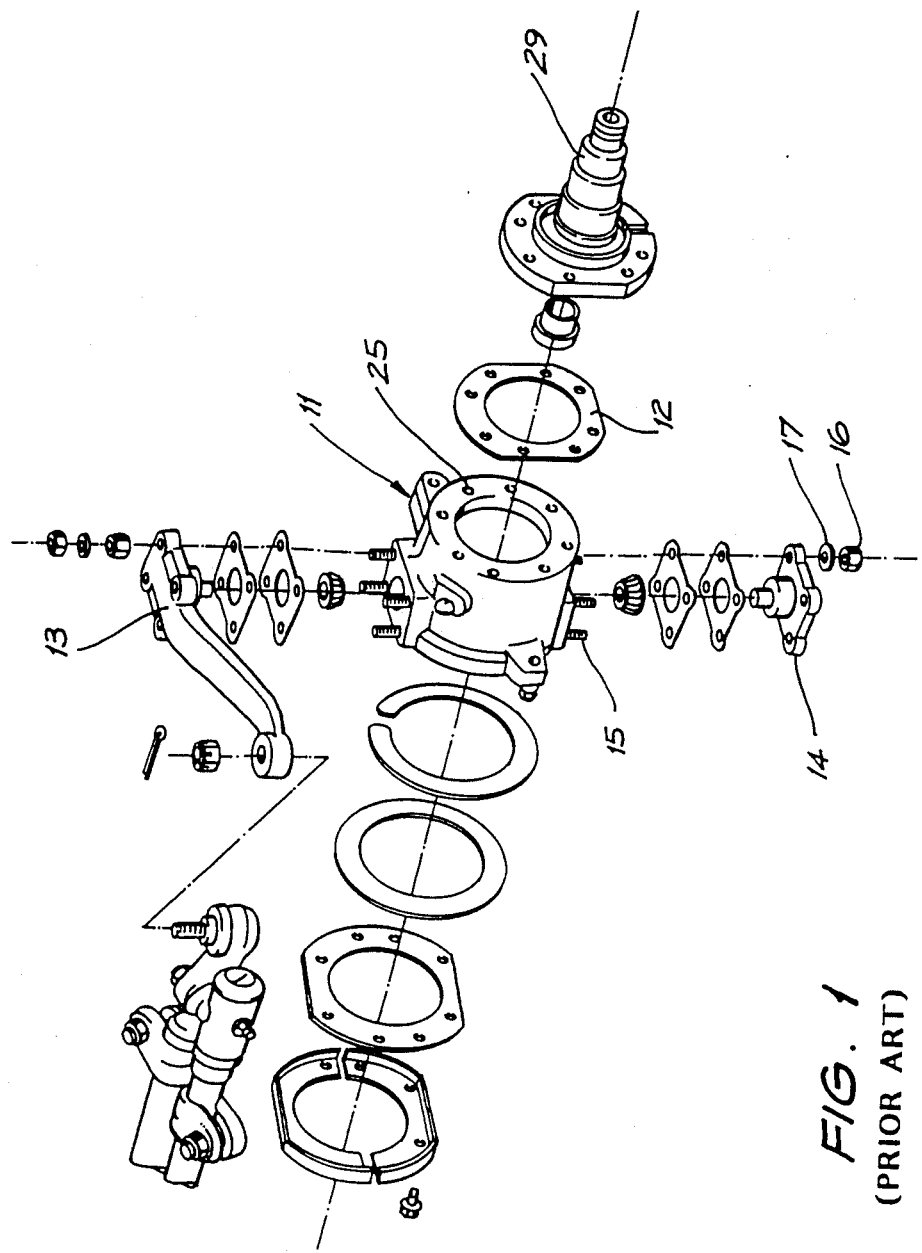
FIG. 1 is an exploded view of one embodiment of a conventional closed steering knuckle arrangement.
Figure 2:
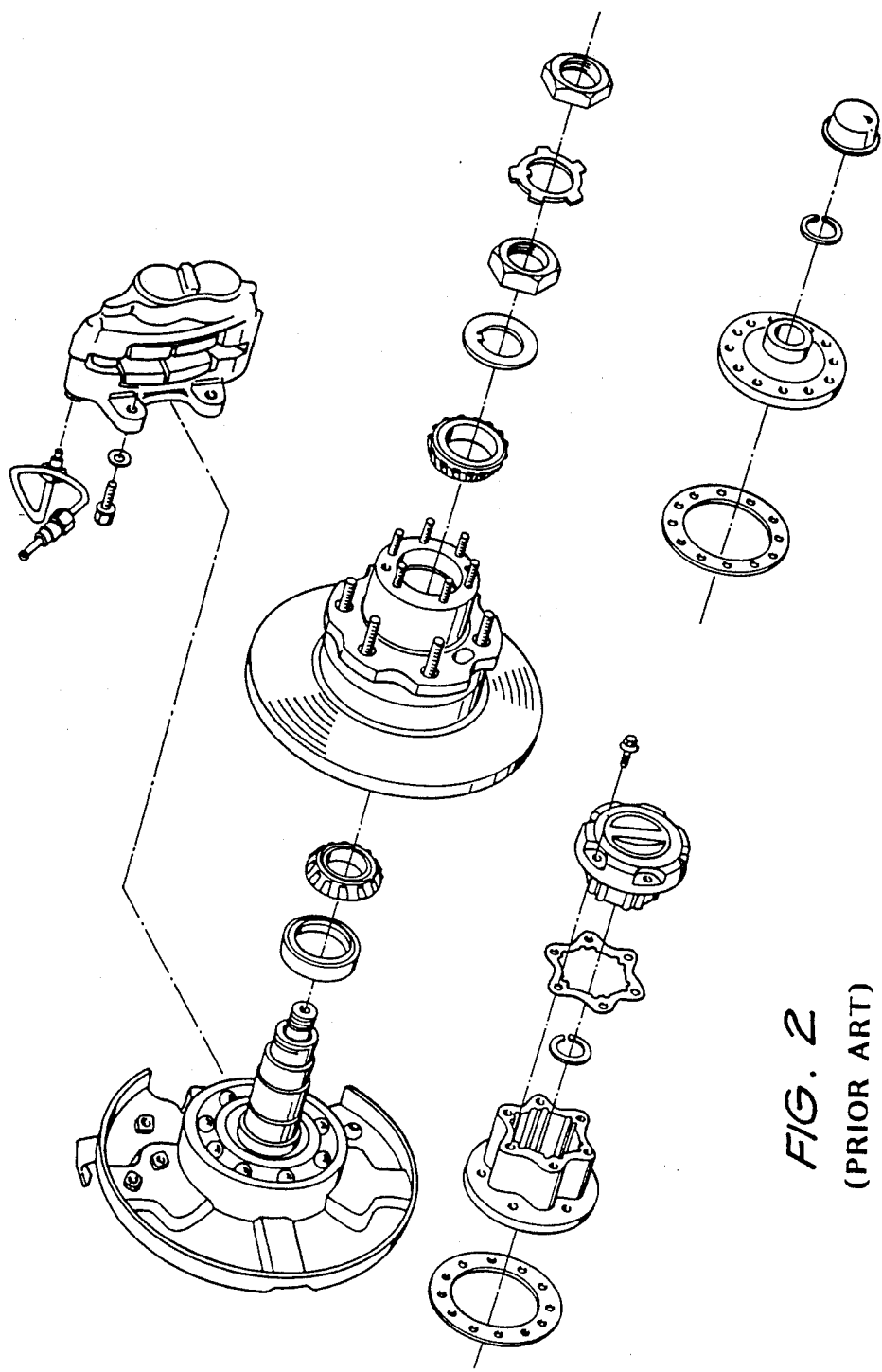
FIG. 2 is an exploded view of components associated with a knuckle spindle.

In FIG. 1 it can be seen that a knuckle spindle 29 is connected to a steering knuckle 11, sandwiching a shim 12 therebetween. Insertion of a shim 12 of non-uniform thickness is one of the prior art methods of varying camber. FIG. 2 shows the numerous other components that also need to be removed in order to remove the knuckle spindle 11 and insert the shim 12. By means of an embodiment of the present invention there is no requirement that the many parts illustrated in FIG. 2 be removed in order to effect camber adjustment. Returning to FIG. 1, an upper bearing cap 13 and a lower bearing cap 14 are fixed by studs 15, nuts 16 and washers 17 to the steering knuckle 11. Upper bearing cap 13 in this instance comprises a knuckle arm integrally incorporating a bearing cap. As mentioned previously, such an article is included within the scope of the term "bearing cap" for this application.

Figure 3A:
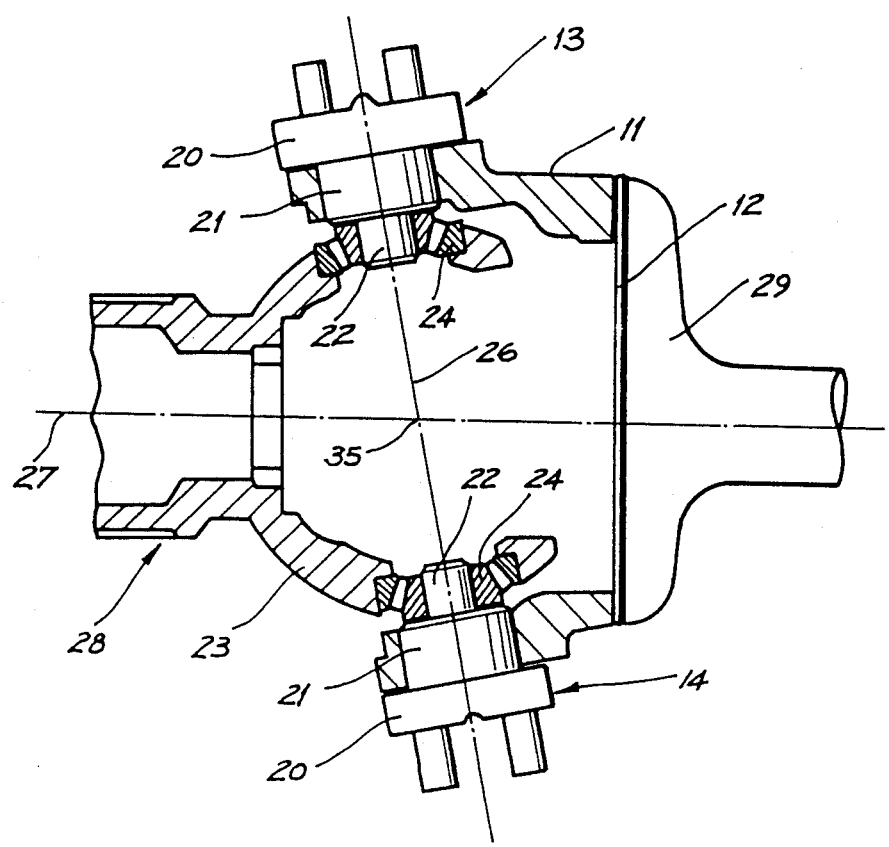
FIGS. 3a and 3b are cross-sectional views of a closed knuckle steering assembly illustrating an embodiment of the first aspect of the present invention.

Referring to FIG. 3a, it can be seen that the upper and lower bearing caps 13 and 14 comprise a backing body 20, a first cylindrical part 21 and a second cylindrical part 22. The first cylindrical part 21 engages the steering knuckle 11 and the second cylindrical par 22 engages the axle tube end 23. A bearing 24 enhances free rotation of the second cylindrical part 22 of the bearing caps 13, 14 in the axle tube end 23. The shim 12 and spindle 29 of FIG. 1 are connected to exterior face 25 of the steering knuckle 11.

From FIG. 3a it can be seen that in the conventional arrangement, the first and second extensions 21, 22 are concentrically positioned on the backing body 20. Each extension has an axis of symmetry coaxial with the king pin axis 26 about which the steering knuckle 11 at least partially rotates. For the sake of clarity in this illustration, a horizontal axis 27 is shown, representing coaxial alignment of the axle tube 28, steering knuckle 11 an knuckle spindle 29.

Figure 3B:
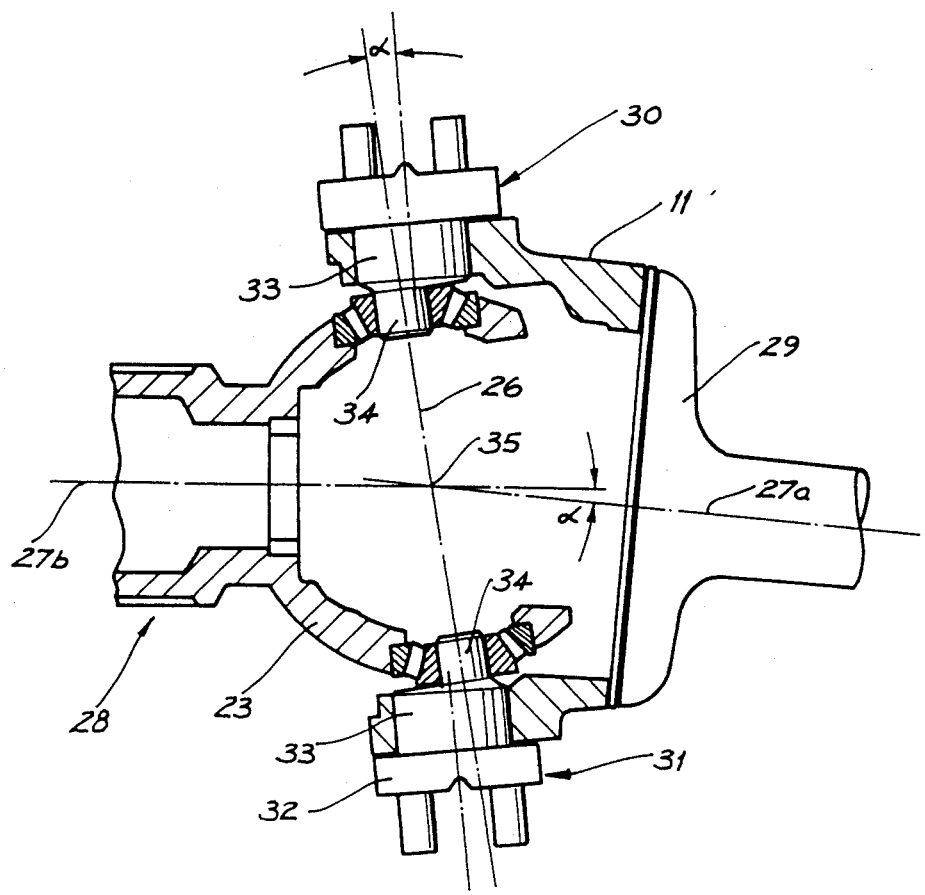

FIG. 3b illustrates a steering knuckle assembly incorporating upper and lower bearing caps 30, 31 which embody the first aspect of the present invention. The upper and lower bearing caps 30, 31 comprise a backing body 32, a first cylindrical part 33 and a second cylindrical part 34 similar to those illustrated in FIG. 3a but wherein second cylindrical parts 34 are eccentrically located on the respective first cylindrical parts.

Replacement of the conventional upper and lower bearing caps 13, 14, of FIG. 3a with the inventive bearing caps 30, 31 shown in FIG. 3b effectively rotates the steering knuckle 11 about the axle tube end 23. As the steering knuckle and steering spindle are rigidly connected, both components are rotated through an angle α relative to the axle tube end. Accordingly the axes of symmetry 27a and 27b respectively of the knuckle spindle 29 and axle tube 28 are no longer coaxial in this example. As the steering wheel ultimately rotates about axis 27a it will be clear to those skilled in the art that the steering wheel camber will also have been adjusted by angle α.

It can be seen from FIG. 3b that the axle tube axis 27b, king pin axis 26 and knuckle spindle axis 27a all intersect at the one point 35. This point coincides with the universal joint (not shown) connecting the axle shaft and drive stub (also not shown), which incidentally, are coaxial with axes 27b and 27a respectively. As the intersection point 35 is in exactly the same position in both FIGS. 3a and 3b no dislocation of the axle shaft or drive stub occurs, if camber is adjusted in this way. Furthermore it is clear that the drive stub and knuckle spindle remain coaxially oriented as they share the axis of symmetry 27a in the adjusted position.

Furthermore, as the relative orientation between the spindle 29 and steering knuckle 11 does not vary during camber adjustment, the position of a brake caliper (not shown) connected to the steering knuckle 11 will not be changed with respect to a brake disc (also not shown) mounted on spindle 29. This means that camber adjustment can be carried out without the need to machine components or insert compensating shims.

In the manufacture of bearing caps according to the present invention it is necessary to provide an eccentricity of cylindrical parts 34 relative to cylindrical parts 33 in precise correspondence to the desired camber adjustment. The required eccentricity can be calculated by the formula $$e \approx 2 \sin\left(\frac{\alpha}{2}\right)$$

which, for small values can be approximately by $e = R\alpha$ where:

e is eccentricity

R is the radial distance between point of connection between the two cylindrical parts 33, 34 and the intersection point 35.

α is the desired camber adjustment angle measured in radians.

It should be noted that the preferred embodiment is meant to be used without any further modification being required to the steering knuckle 11 or the axle tube end 23. Therefore due to the relative rotation of the steering knuckle with respect to the axle tube end, cylindrical parts 33, 34 must also extend in directions which vary by an angle α, the camber adjustment angle. If this were not so, extensive modifications would be required to the steering knuckle 11 in order that it be compatible with the bearing cap.

Adjustment of camber using this aspect of the present invention is a simple operation. Although the upper and lower bearing caps 13 and 14 fit firmly into the steering knuckle 11 and the axle tube end 23, the bearing caps can be easily removed. In practice this involves removing nuts 16 and washers 17, inserting a wedge or lever between the contact surfaces of the steering knuckles 11 and respective upper and lower bearing caps and levering the bearing caps out. Thus the bearing caps can be quickly and simply disengaged from the steering knuckle 11 and the axle tube end 23 and using simple tools such as a pinch bar or lever.

Replacement of conventional upper and lower bearing caps 13 and 14 by bearing caps embodying the present invention will result in an adjustment to camber by simply removing the conventional bearing caps and installing bearing caps embodying the present invention, a precise camber adjustment can be performed that avoids the prior art deficiencies described above. It will be clear to those skilled in the art that the present invention represents an important and valuable improvement over the prior art.

With respect to camber adjustment means described above, it is envisaged that it is possible to provide a means of indexing the cylindrical parts 34 and 33 of FIG. 3b in a slight rotary relationship within upper and lower bearing caps 30 and 31 thus providing means for incremental adjustment of the camber angle.

Figure 4:
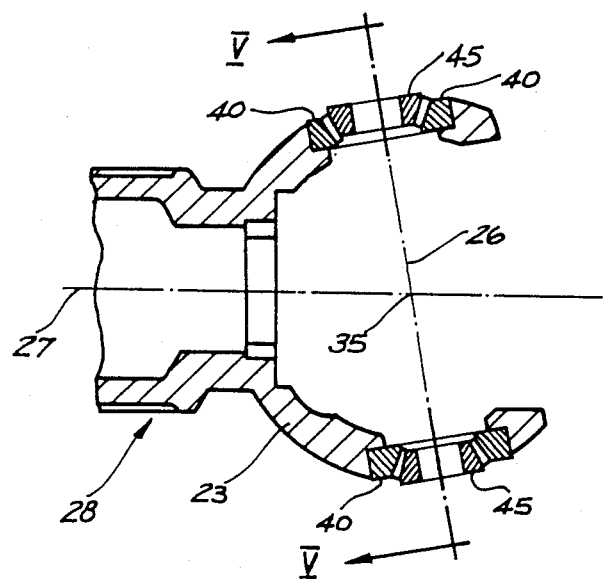
FIG. 4 is a cross-sectional view of an axle tube end illustrating an embodiment of the second aspect of the present invention.
Figure 5:
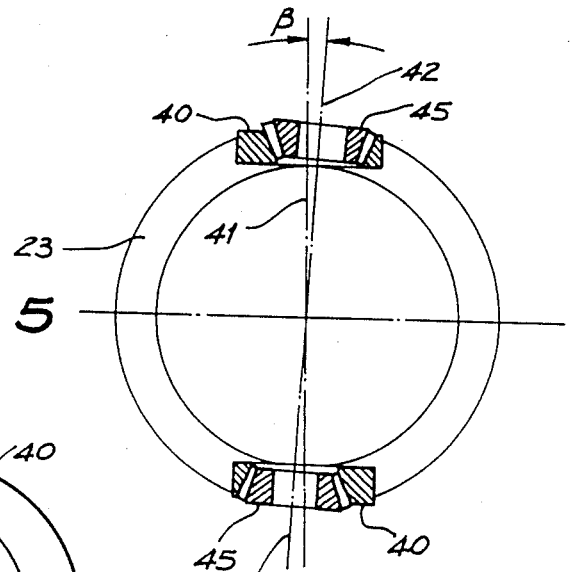
FIG. 5 is a view on Section V—V of FIG. 4.

In FIG. 4 an axle tube end is shown in cross-section. The conventional upper and lower bearings 24 are replaced by an eccentric bushing and bearing combination in the preferred embodiment of this aspect of the present invention. A bearing cone 45, adapted to receive the pin 22 extending from the upper and lower conventional bearing caps 13, 14 is disposed in an eccentric bushing 40 as shown in FIG. 5. Upper and lower eccentric bushings are installed in the axle tube end 23 such that the axes of symmetry 41 of the external surface of the eccentric bushings 40 are coincident with original king pin axis.

When installed, the upper and lower bearing caps will engage the eccentrically located bearing cones 45 and will therefore rotate about the axis of symmetry 42 of the internal surface of the eccentric bushings 40. The displacement between axes of symmetry 41 and 42 is indicative of a relocation of the king pin axis 26. A predetermined reorientation by an angle β0 in the king pin axis 26 in regard to castor adjustment can be produced by manipulation of the degree of eccentricity introduced by upper and lower eccentric bushings 40. It will be apparent to a skilled addressee that for castor adjustment, rotation of the king pin axis occurs through a plane oriented at right angles to a plane in which the king pin axis is rotated for camber adjustment.

Figure 6:
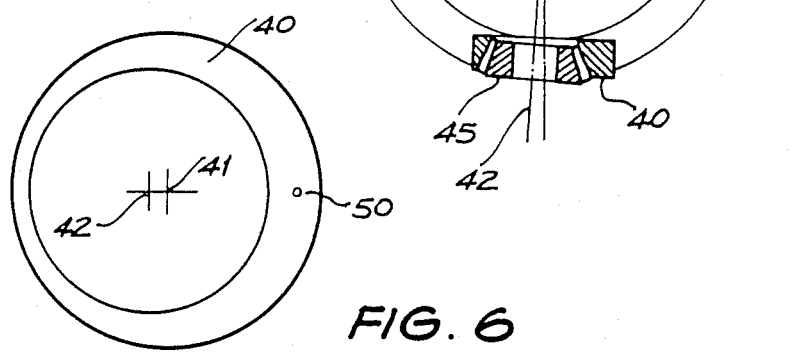
FIG. 6 is a plan view of an eccentric bushing.

In the preferred embodiment of the bushing shown in FIG. 6, an indexing point 50 is marked on the eccentric bushing. As upper and lower bushings must introduce eccentricities of equal and opposite magnitude to be effective in rotating the king pin axis, such a marking is of assistance in ensuring precisely opposite orientation. An indexing mark is also of assistance to indicate if positive or negative adjustment is being made. Rotation of the bushing through 180° (as indicated by the indexing mark) will reverse the castor produced from positive to negative and vice versa.

Alternatively to the foregoing embodiment of this aspect of the invention, it would be possible to combine the bearing cone 45 and eccentric bushing 40 to produce a composite eccentric bearing cone which allows rotation about an axis eccentric to the outer surface of such a composite bearing. In a preferred form such eccentric bearing cones would also include the indexing mark or datum hereinbefore described.

It will be recognised by persons skilled in the art that numerous variations and modifications may be made to the invention as described above without departing from the spirit or scope of the invention as broadly described.

I claim:

1. A complementary pair of upper and lower king pin bearing caps for providing camber adjustment in a closed knuckle steering system, each bearing cap comprising:
    a backing plate rigidly connectable to said closed steering knuckle;
    a first part extending from said backing plate and engageable in said closed steering knuckle; and
    a second part extending eccentrically from said first part, said second part being engageable rotatably in an axle tube end of said closed knuckle steering system;
    eccentricity between said first and second parts providing camber adjustment when said complementary upper and lower bearing caps are installed in said closed knuckle steering system.

2. The bearing caps according to claim 1, wherein said eccentricity between said respective first and second parts corresponds to a required circumferential rotation in said steering knuckle relative to said axle tube end to effect a desired camber adjustment.

3. The bearing caps according to claim 1 or 2, wherein the angular displacement between the axes of respective first and second parts equates to a desired camber adjustment.

4. The bearing caps according to claim 1, wherein said first and second parts are cylindrical in shape.

5. A system for reorienting the king pin axis of a closed knuckle steering system, comprising:
    a pair of upper and lower king pin bearing caps, each bearing cap comprising:
        a backing plate rigidly connected to said closed steering knuckle;
        a first part extending from said backing plate and engageable in said closed steering knuckle;
        a second part extending concentrically from said first part, said second part being rotatably engageable in an axial tube end of said closed knuckle steering system; and
    a pair of complimentary upper and lower inserts located in said axial tube end, each said insert having an outer surface and an inner surface, said outer surfaces of said upper and lower inserts being coaxial with a first king pin axis and said inner surfaces of said upper and lower inserts being coaxial with a second king pin axis, said first and second king pin axes being non-coaxial.

6. The system according to claim 5, wherein each insert comprises a bearing rotatable about an axis eccentric to the axis of the outer surface of said respective insert.

7. The system according to claim 5, wherein each insert comprises a bushing for receiving a bearing.

8. The system according to claim 6 or 7, wherein the outer surface of said insert includes an indexing mark for indicating a direction of reorientation of said second king pin axis.

* * * * *